May 7, 1968 R. J. PURTELL 3,381,894
METHOD OF ALIGNING IRRIGATION SYSTEM
Original Filed Jan. 20, 1964 5 Sheets-Sheet 1

RUFUS J. PURTELL
*INVENTOR.*

RUFUS J. PURTELL
INVENTOR.

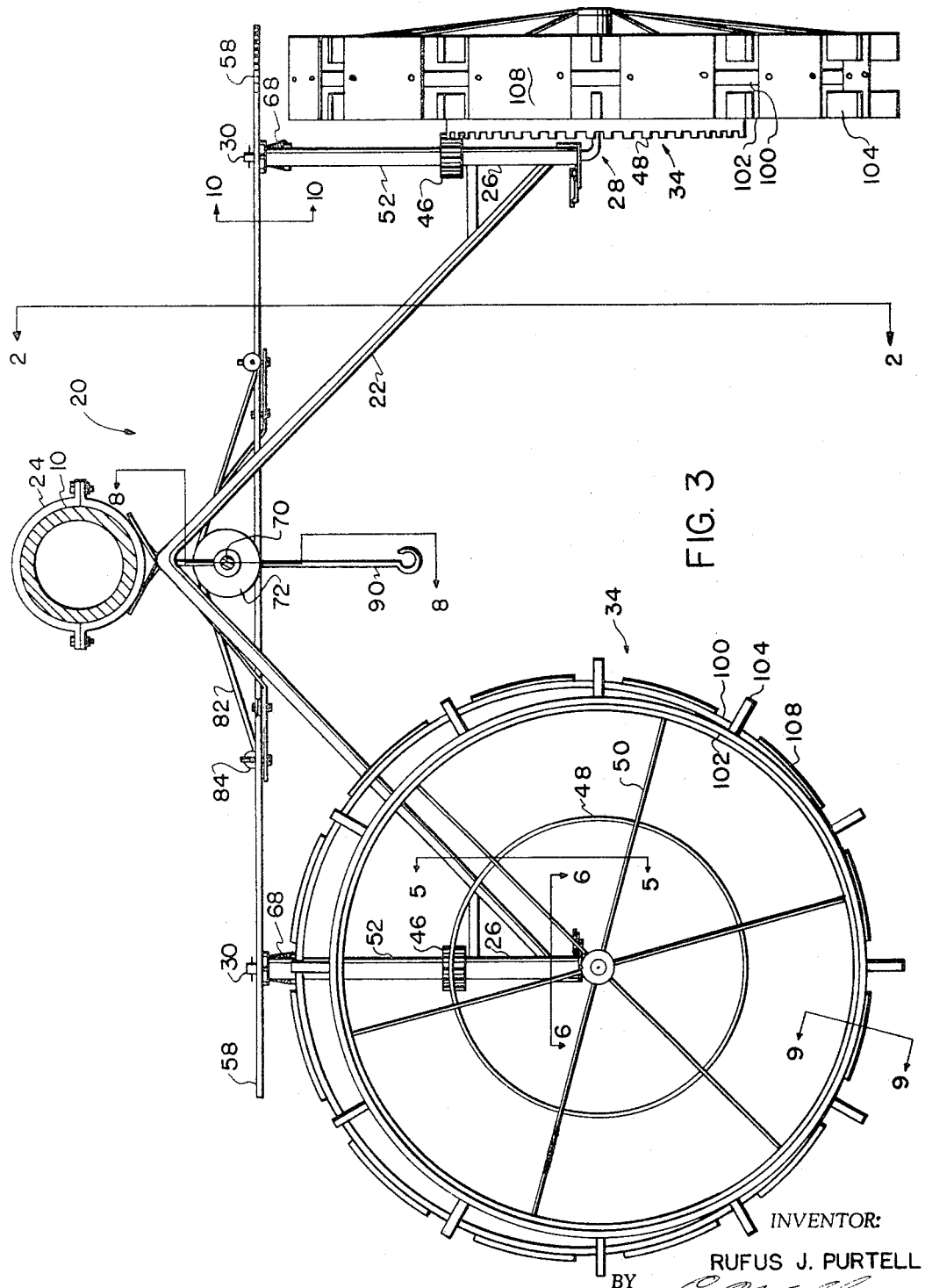

May 7, 1968      R. J. PURTELL      3,381,894
METHOD OF ALIGNING IRRIGATION SYSTEM
Original Filed Jan. 20, 1964      5 Sheets-Sheet 4
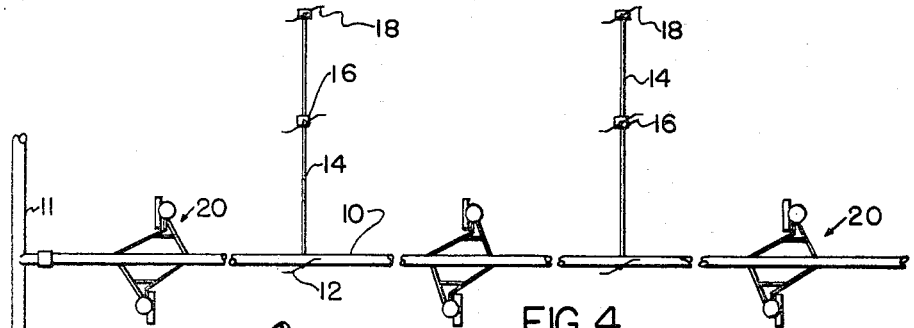
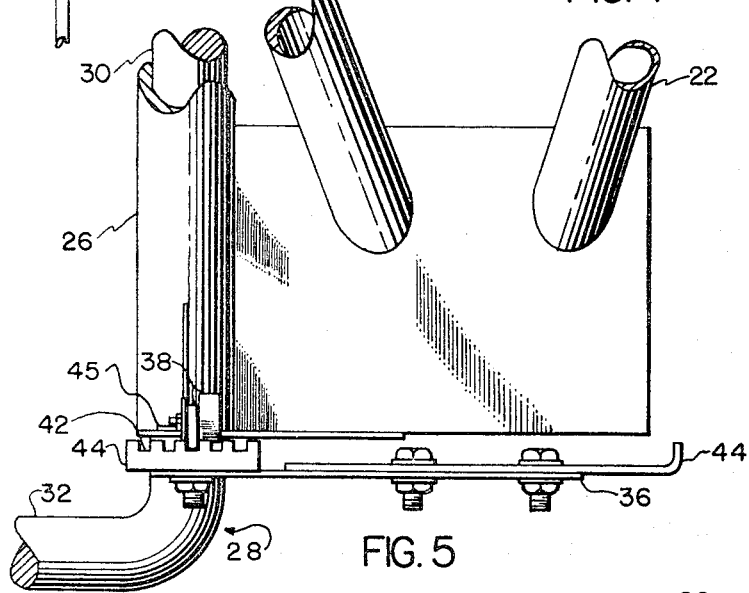
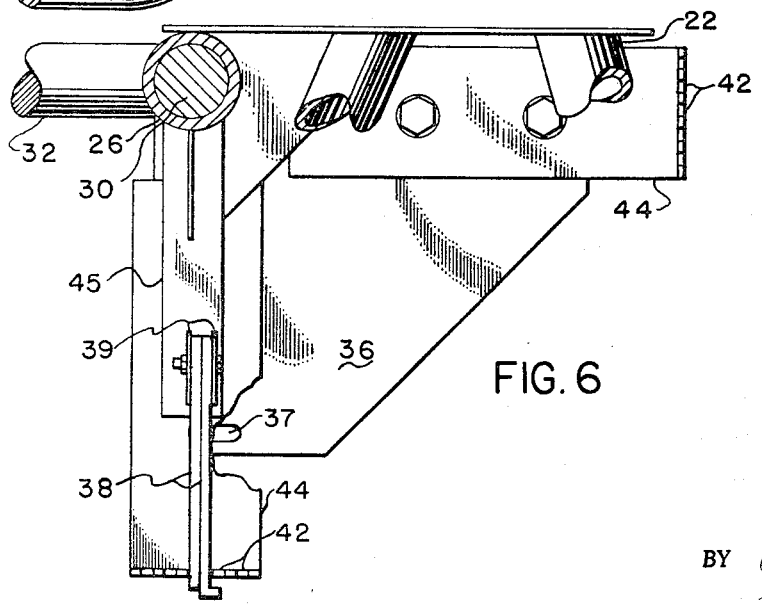
RUFUS J. PURTELL
*INVENTOR.*
BY May 7, 1968 R. J. PURTELL 3,381,894
METHOD OF ALIGNING IRRIGATION SYSTEM
Original Filed Jan. 20, 1964 5 Sheets-Sheet 5

RUFUS J. PURTELL
INVENTOR.

BY

United States Patent Office 3,381,894
Patented May 7, 1968

3,381,894
METHOD OF ALIGNING IRRIGATION SYSTEM
Rufus J. Purtell, Brownfield, Tex., assignor, by mesne assignments, to Tri-Matic, Inc., a corporation of Texas
Continuation of application Ser. No. 338,768, Jan. 20, 1964, now Patent No. 3,245,595, dated Apr. 12, 1966. This application Feb. 11, 1966, Ser. No. 526,867
2 Claims. (Cl. 239—1)

ABSTRACT OF THE DISCLOSURE

An agricultural system moves an overhead sprinkler pipe by a plurality of wheeled vehicles. Each vehicle is driven by a shaft extending the full length of the pipe from one vehicle to the other. Misalignment is detected by a stiff arm and if a vehicle is misaligned, a variable-diameter sheave upon the drive shaft is adjusted to have a greater or lesser diameter so that the particular vehicle will be driven at a higher or lower speed to enable the vehicle to return to alignment.

---

This is a continuation of my prior patent application, Ser. No. 338,768, filed Jan. 20, 1964, now U.S. Patent No. 3,245,595 and is co-pending with my prior application, Ser. No. 264,507, filed Mar. 12, 1963, now U.S. Patent No. 3,245,608.

This invention relates to agricultural irrigation and more particularly to a vehicular system for moving agricultural irrigation sprinkler pipe from one location to another.

A problem which exists in systems for moving sprinkler pipe is keeping the vehicles in line. These systems are often one thousand three hundred feet in length and by slippage of the wheels in mud or otherwise, often the individual vehicles of the system tends to become misaligned. I have solved this problem by providing a variable speed ratio drive between the rotating shaft by which the vehicles are powered and the wheels on the vehicles themselves. Common, ordinary variable diameter V belt sheaves are used in this variable speed transmission. A turnbuckle-type arrangement is used to vary the diameter of the sheaves as required.

Another problem which has existed is the accumulation of mud upon the wheels of the vehicle. I have solved this problem by providing a loose hoop or band which encircles the wheel and is held in place by the lugs of the wheel. The hoop has flaps of flexible material, such as rubber belting, attached thereto to relieve the mud from the wheel.

It is a desirable practice to have trail tubes extending behind the main sprinkler pipe to discharge water therefrom. When moving, the drag of these trail tubes can overturn the vehicles. Therefore, I have found it desirable to attach weights to the vehicles to prevent them from overturning.

Another desirable feature is to provide for disengaging the drive to the wheels in case the vehicles are to be towed behind a tractor moving from one field to the other, or in the event that it is desired to move a particular vehicle by hand.

Another problem with irrigation pipe moving systems is that the entire system sometimes tends to move axially. This axial movement may result from the fact that the system is operating on a hillside with one end lower than the other. Also, this axial movement might result from the fact that it is moving across land where the rows are angled to the direction of movement. In other cases, systems seem to move axially without logical explanation however, it is supposed that the different ground from one end of the system to the other would be the cause of this movement. I have designed a system whereby the wheels can be angled to a very small movement so as to cause the system to be moved straight. Also, this adjustment is desirable inasmuch as sometimes the boundaries of a field deviate slightly from 90° corners. In such a case, it is desirable to have the system move at a slight angle so that it is always in position to be connected to the main supply pipe. I have provided a system which may be adjusted so that the wheels are set at a slight angle to the pipe to either cause the system to move straight on a hillside or to move at angles in case it is desired to do so.

Objects of this invention are to provide a system for moving agricultural irrigation sprinkler pipe which provides the above desirable features and overcomes the above discussed problems.

Further objects are to achieve the above with a device that is sturdy, compact, durable, simple, versatile, and reliable, yet inexpensive and easy to manufacture and operate.

Still further objects are to achieve the above with a method that is rapid, inexpensive, and easy for inexperienced, unskilled people to perform.

The specific nature of the invention as well as other objects, uses, and advantages thereof will clearly appear from the following description and from the accompanying drawings, the different views of which are not necessarily to the same scale, in which:

FIG. 3 is a side elevational view of one vehicle of the system with one wheel set for transverse movement and one wheel set for longitudinal movement.

FIG. 4 is a plan view of a plurality of vehicles somewhat schematic showing the general arrangement of the system.

FIG. 5 is a sectional partial detailed view taken on line 5—5 of FIG. 3.

FIG. 6 is a sectional partial detail view of a portion of the vehicle taken on line 6—6 of FIG. 3.

Figure 1:
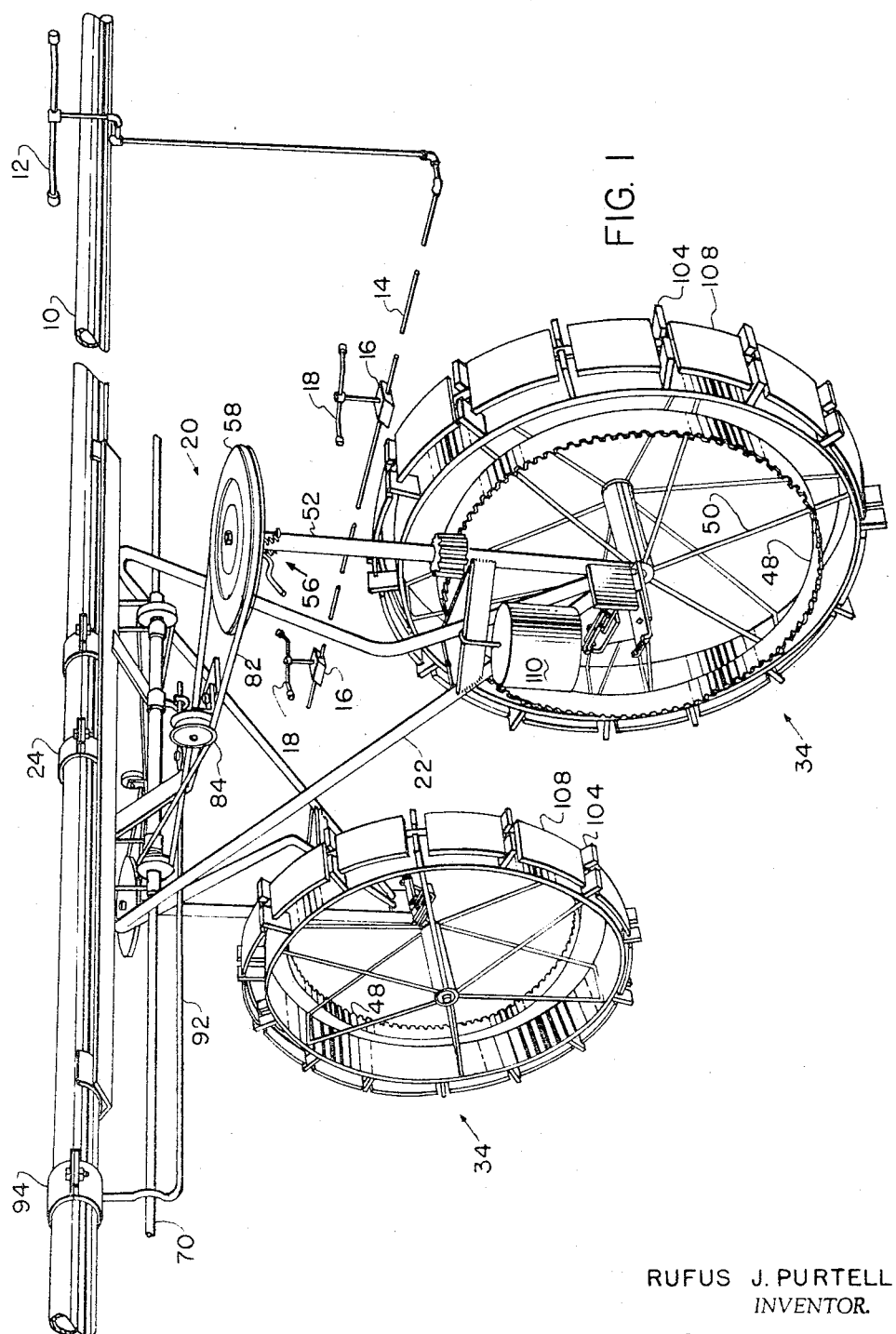
FIG. 1 is a perspective view broken away in parts illustrating a system according to this invention.

Referring more particularly to the drawings, pipe 10 is adapted to carry water under pressure and discharge this water through sprinklers 12 mounted upon the pipe onto the land to be watered. In addition, trail tubes 14 are attached to the pipe 10 which through the use of connectors 16 have one or more sprinklers 18 which also discharge water upon the land to be irrigated.

The pipe 10 is connected to header pipe 11 which is a source of water under pressure to pipe 10 (FIG. 4). The pipe 10 is adapted to carry water under pressure. Sprinklers 12 and tubes 14 and sprinklers 18 form means for distributing the water upon the land to be irrigated. Means are provided for draining the pipe 10 and the trail tubes 14 as disclosed in my prior applications noted above.

A plurality of vehicles 20 are attached to the pipe 10, supporting the pipe and moving the pipe generally transverse to the longitudinal axis of the pipe to different locations. Each vehicle has frame 22. Clamp 24 upon the frame 22 provides means for clamping the pipe 10 securely to the frame 22 (FIGS. 1, 2, 3, 5, and 6). Two vertical tubes 26 are attached to the frame 22 symmetrically arranged relative to the clamp 24. A bracket 28 is journalled within each tube 26. Each bracket 28 is in the form of an L shaped shaft which has a vertical leg 30 which is journalled within the tube 26 and a horizontal leg 32 which forms the spindle for ground engaging wheel 34.

The vertical leg 30 has horizontal plate 36 welded thereto near the bottom which forms a stop for the tube 26 on the frame 22.

Two index plates 44 are bolted to the plate 36 (FIGS. 5 and 6). Each index plate 44 has a plurality of notches 42 located in an upturned portion thereof. Arm 45 is attached by welding or otherwise to the bottom of tube 26. Two leaves 38 are pivoted about a horizontal axis to the arm 45. The notches 42 are less than the combined width of the two leaves 38 so that only one leaf may be engaged in a notch at any one time. The bolt about which the leaves 38 are pivoted is mounted about two ears 39 attached to the arm 45 so that the leaves are restrained against lateral movement. By engaging either one or the other of the leaves 38, a very fine adjustment may be made as to the angular direction of the bracket 28 and therefore, a very close adjustment can be made as to the direction the wheels 34 point. As stated in the introduction, the wheels 34 may be set at a small angle to the pipe 10 so as to prevent the pipe from moving axially in case the system is operating on a hillside or to make the system run at a slight angle in case such operation is desired. The index plates 44 are attached to the plate 36 by means of slotted holes 37 so they may be adjusted if desired. The wheels 34 may be rotated 90° as shown by the right hand wheel of FIG. 3 so that the vehicle may be moved in an axial direction if such is desired, i.e. to move the system from one field to another, the wheels 34 may be moved to a position as shown by the right wheel in FIG. 3 and the entire system moved in an axial direction either by the power shaft 70, as will be explained later, or by a towing tractor.

Figure 2:
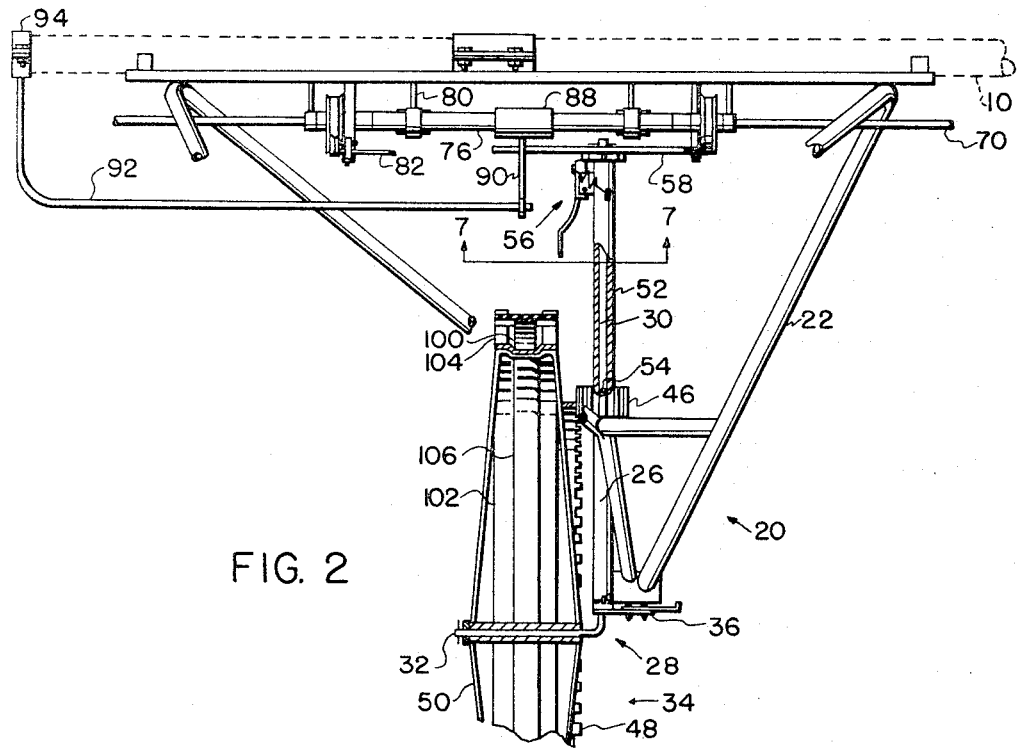
FIG. 2 is a section view of one vehicle of the system taken on line 2—2 of FIG. 3 with parts broken and cut away for the purpose of clarity.
Figure 10:
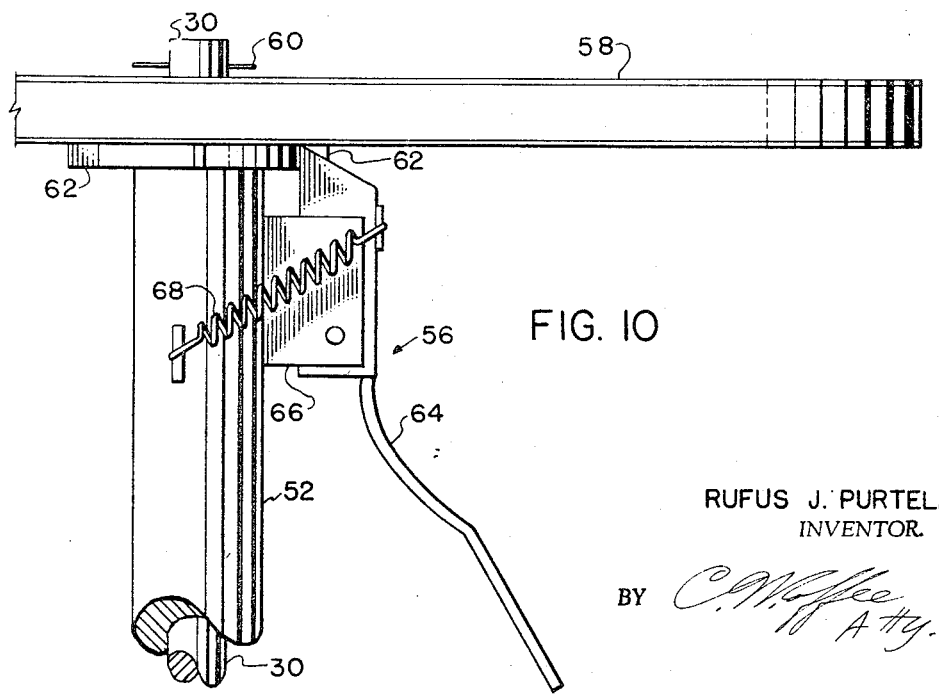
FIG. 10 is a sectional view taken on line 10—10 of FIGS. 3 and 7.

Pinion 46 is mounted for rotation upon the vertical leg 30 immediately above tube 26 (FIGS. 1, 2, and 3). It mates with gear 48 which is attached to the spokes 50 of each wheel 34. Pinion tube 52 is attached to the top of the pinion 46 and also is journalled for rotation about vertical leg 30. The pinion 46 is longer than the width of the teeth in gear 48. As one portion of the pinion 46 becomes worn, the position of the pinion relative to the gear is adjusted by placing washers between the pinion and the tube 26, thereby bringing another portion of the pinion into engagement with the gear 48. Hole 54 is drilled through vertical leg 30 so that if it is desired to maintain the pinion 46 out of engagement with the gear 48, a pin is placed through the hole 54 and therefore, the pinion 46 disengaged from the gear 48.

Figure 7:
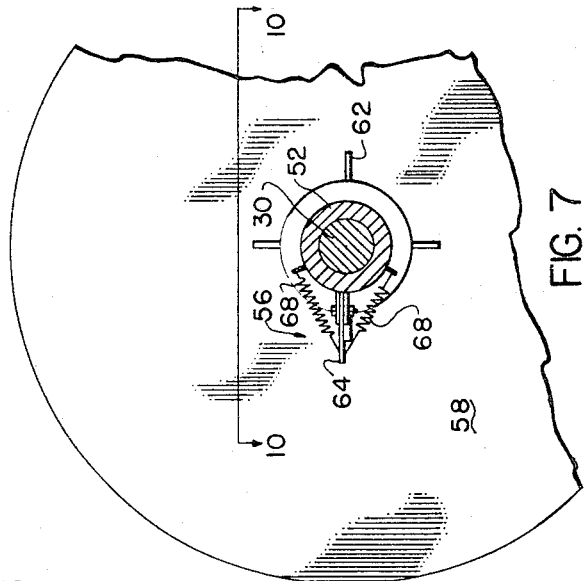
FIG. 7 is a partial sectional view taken on line 7—7 of FIG. 2.
Figure 8:
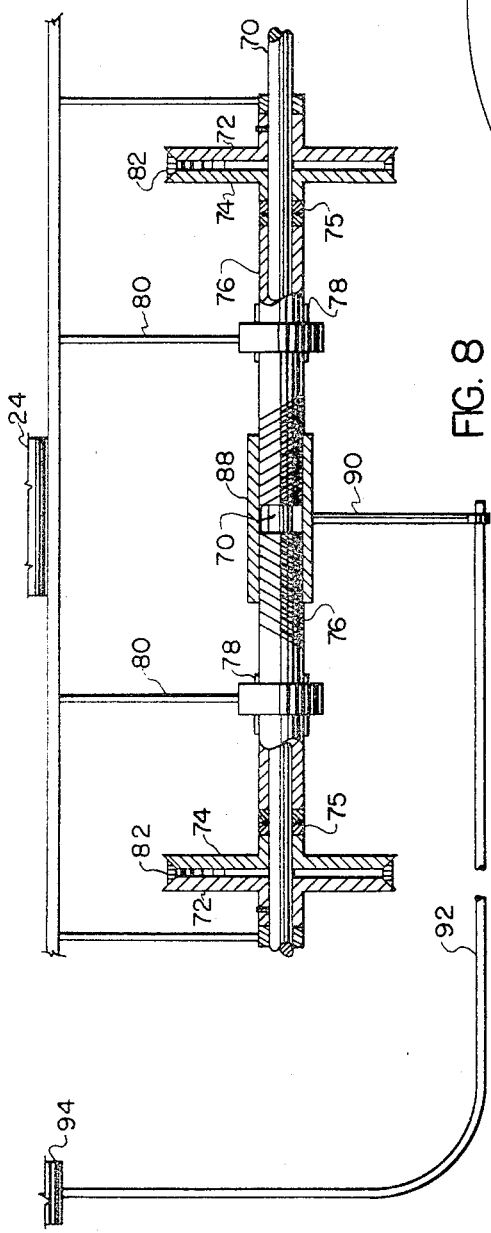
FIG. 8 is a partial sectional view taken on line 8—8 of FIG. 3.

In addition, dog clutch 56 is provided between the pinion tube 52 and horizontal sheave 58 which is mounted for rotation about the vertical leg 30 above the pinion tube 52 (FIGS. 2, 3, and 7). Pin 60 through the top of the vertical leg 30 prevents the sheave 58 from riding upward although in general, gravity prevents this. The dog clutch 56 includes a plurality of radial vanes 62 extending from the hub of the sheave 58. Lever 64 is pivoted between ears 66 which are welded to the top of the pinion tube 52. Spring 68 extends from the lever 64 to the pinion tube 52 in such manner that it holds the lever 64 engaged with the vanes 62 in one position or disengaged in the second position. Thus, I have provided for interrupting the drive train from sheave 58 to wheels 34. The pinion 46 may be raised from engagement with gear 48 or the lever 64 of dog clutch may be disengaged from the vanes 62 of the sheave 58.

Shaft 70 extends along the pipe 10 immediately below it and extends from one end of the system to the other (FIGS. 1, 2, 3, 8, and 10). The shaft 70 is rotated by conventional means such as a motor which is known to the art and therefore, are not discussed here. At each vehicle 20, the shaft 70 has two variable diameter sheaves attached thereto. The outer half 72 of each sheave is connected to the shaft 70 as by a set screw through the hub thereof. The inner half 74 of each variable diameter sheave is mounted to move axially along the shaft 70. Two threaded bearings 76 surround the shaft 70 and one end of each threaded bearing 76 bears against one of the inner halves 74 through a thrust bearing 75. Each threaded bearing 76 has a key 78 thereon which fits within a slot within hanger 80. Each of the hangers 80 is attached as by welding to the frame 22 of the vehicle 20. Therefore, the threaded bearings 76 are mounted for axial movement but are restrained so they cannot rotate. V belt 82 is trained around each of the variable diameter sheaves, by one of the idlers 84, around horizontal sheave 58, around another idler 84, and back to the variable diameter sheave. The idlers 84 are attached to arm 86 which is attached to the frame 22.

Sleeve 88 encircles one end of each of the threaded bearings 76. Pendant 90 extends from the sleeve 88. The sleeve 88 is threaded with right hand threads on one end and left hand threads on the other. Arm 92 is attached to pipe 10 by clamp 94. Thus, if any vehicle 20 becomes misaligned with the other vehicles, the pipe 10 will bend between the clamp 24 and the clamp 94. This bending of the pipe will be transmitted through arm 92 which is attached to pendant 90 so that as to rotate sleeve 88. Rotation of the sleeve 88 will cause the threaded bearings 76 to expand or contract. By expand, I mean move away from one another; and by contract, I mean move toward one another. When the threaded bearings 76 expand, they cause the inner half 74 of the variable diameter sheaves to move toward the outer halves 72. This movement increases the effective radius of the sheaves on which the V belt 82 operates. This increase of the diameter causes the belt 82 to move at a faster speed which causes the vehicle 20 to move at a more rapid speed. Misalignment of the vehicle which would cause a contraction of the threaded bearing 76 would result in a slowing down of the vehicle 20. Thus, I have provided means to maintain the vehicles 20 in line. This means for aligning includes changing the speed ratio of the gearing between the shaft 70 and the wheels 34. The gearing connecting the shaft and the wheels includes variable diameter sheaves (having the halves 72, 74), the V belt 82, the sheave 58, the dog clutch 56, the pinion 46, and the gear 48. The means for changing the speed ratio includes the variable diameter sheaves. The arm 92 and the clamp 94 form means for detecting if the vehicle 20 is misaligned.

It will be noted that the variable diameter sheaves are self-centering without any direct connection between them; i.e. if the front wheel 34 were to tend to rotate faster than the back wheel 34, the V belt 82 driving the front wheel would have more tension than the other inasmuch as the front wheel would be pulling the back wheel and the V belt 82 to the back wheel would tend to become slack inasmuch as the back wheel would not be driving the vehicle 20 forward, but would be merely idling. This greater tension in the front belt 82 would be transmitted through the variable diameter sheave inside half 74 through the threaded bearings 76 to the inner half 74 of the other sheave and inasmuch as the belt 82 on the other sheave would be loose, there would not be so much resistance offered to increase the diameter of said sheave.

As may be seen, frame 22 extends on either side of pipe 10. One side will be designated as the forward side and the other as the rear side although it will be understood that by reversing the direction of rotation of the shaft 70, the vehicle will travel in the opposite direction. If the vehicles travel in the opposite direction is necessary to move the trail tubes 14 around the other way, but in any event, there will always be a forward and rear side of the vehicles 20 depending upon which side the trail tubes are on. Even if the trail tubes 14 are not used, it would be a convenient designation to designate one side as forward and the other as rear. The forward wheel 34 on the forward part of the frame 22 is on one side of the frame when the pipe 10 is moving transversely to its longitudinal extent while the rear wheel 34 is on the opposite side of the frame 22 from the front wheel. Of course, when the system moves transversely to the pipe 10 the axis of each wheel 34 is parallel to the pipe. The forward wheel rotates clockwise while the rear wheel rotates counterclockwise when viewed from the frame. Therefore, if it is necessary or desirable to move the system in a direction such as parallel to the frame, both wheels may be rotated so that they are in the position with their axis normal to the pipe 10 and driven so that one wheel 34 is driven in a clockwise direction when viewed from the frame 22 and the other wheel is driven in a counterclockwise direction when viewed from the frame.

Also, it will be apparent upon analysis, that if the wheel 34 were both on the same side of the frame, they would both have to rotate in the same direction as viewed from the frame to move the system transversely of the pipe. However, if they were rotated outwardly so that the axes were parallel as viewed from the frame, one would have to rotate in a clockwise direction and the other in a counterclockwise direction as viewed from the frame. By having the wheels on opposite sides of the frame at all times, they may be set to move in any direction or the shaft 70 reversed without the changing of the belts 82.

It is desirable for the vehicles 20 to travel at the same speed. To achieve this and to better achieve alignment, it is desirable that the diameter of all the wheels 34 remain the same. Obviously, to manufacture the wheels 34 the same diameter is an easy task, but if mud accumulates on the wheel, it reaches a larger diameter so that alignment becomes more difficult. Therefore, relieving mud from the wheels 34 helps to maintain the vehicles in alignment.

Figure 9:
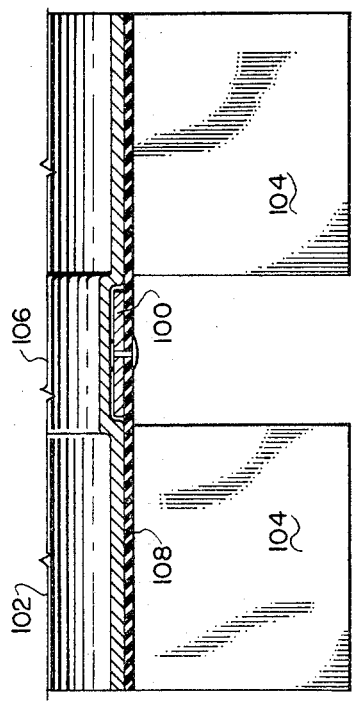
FIG. 9 is a partial sectional view taken on line 9—9 of FIG. 3.

I have provided such a mud reliever which includes hoop or band 100 which has a larger diamter than rim 102 of the wheel 34 (FIGS. 1, 2, 3, and 9). The band 100 is maintained in place by the lugs 104 on the wheel. The lugs 104 are attached in pairs on either side of the band 100 and are spaced peripherally around the rim 102. The diameter of the band 100, while being greater than the diameter of the rim 102, is less than the diameter of the rim and lug 104. Therefore, it may be seen that the band 100 cannot be removed from the wheel 34. The rim 102 has a central depression 106 extending annularly therearound. This depression is about the same depth and width as the band 100 so that the band 100 will fit within the depression 106 and the outside of the band 100 is flush with the remainder of the rim 102. A flexible flap 108 is attached to the outer part of the band 100 as by riveting between each adjacent set of lugs 104. The flexible flap 108 is made of rubber belting or similar flexible, pliable material. The width of the flap 108 is approximately the same as the width of the rim 102. The length of the flap 108 is slightly less than the length between adjacent pairs of lugs 104. As the wheel 34 rotates, on the portion of the wheel 34 at the bottom (as seen in FIG. 9) the band 100 will be within the depression 106 and the flaps 108 will be flat against the rim 102. However, as that particular flap 108 is rotated upward, it will move away from the rim 102. Any mud on the flap 108 will tend to be taken therefrom inasmuch as mud does not stick to a flexible rubber-like surface as well as it does a rigid steel-like surface. On top (FIG. 2) the flap 108 will be completely separated from the rim 102. Thus, I have provided means for relieving mud from the outside of a ground engaging wheel.

The trailing tubes 14 behind the system increases the drag at the top of the system. If the connector 16 becomes entangled in growing plants, the drag may be so much as to threaten to overturn the vehicle 20. In any event, the weight on the front wheel is reduced to what it is on the back wheel.

I have solved this problem as seen in FIG. 1 by adding a weight 110 to the frame 22 on the forward side of each vehicle 20. This weight has not been shown in the other figures for the purpose of simplifying those representations. The weight 110 consists of a cast block of concrete with a metal hook extending from the top to hook over any convenient portion of the frame 22 on the forward side thereof.

It will be apparent that the embodiment shown is only exemplary and that various modifications can be made in construction, materials, and arrangement within the scope of the invention as defined in the appended claims.

I claim as my invention:

1. In an irrigation pipe moving system having
   (a) an elongated pipe adapted to carry water under pressure,
   (b) a plurality of vehicles attached thereto to move the pipe transversely,
   (c) a shaft extending along the pipe,
   (d) journaled for rotation to the vehicles, and
   (e) gearing means interconnecting the shaft and each of the vehicles for moving the vehicles responsive to rotation of the shaft;
   (f) the method of maintaining the vehicles in alignment comprising the following steps in combination:
   (g) detecting if a vehicle is misaligned, and
   (h) changing the speed ratio of the gearing means interconnecting the shaft and each of the vehicles responsive to the detected misalignment of said vehicle.

2. In an irrigation system having a linear irrigation pipe supported by supporting vehicles, each supporting vehicle having a driving mechanism, the method of moving said irrigation pipe across an agricultural field and maintaining said pipe in substantial linear alignment comprisng the steps of:
   (a) rotating a drive shaft parallel to the pipe,
   (b) driving said pipe supporting vehicle transversely to said pipe responsive to rotation of said shaft,
   (c) detecting misalignment of any one vehicle,
   (d) changing the speed ratio of said driving mechanism by which the misaligned vehicle is driven from the rotating shaft, and
   (e) changing said speed ratio responsive to the detected misalignment.

References Cited

UNITED STATES PATENTS 3,245,595 4/1966 Purtell _____ 239—212
3,245,608 4/1966 Purtell _____ 239—212
3,334,815 8/1967 Hogg _____ 239—1

M. HENSON WOOD, JR., *Primary Examiner.*

M. Y. MAR, *Assistant Examiner.*